INVENTORS
UILKO VAN DER WAL
HENDRIK TER BRUGGE

United States Patent Office 3,358,285
Patented Dec. 12, 1967

3,358,285
SHIPBORNE RADAR SYSTEMS
Uilko van der Wal and Hendrik ter Brugge, Hengelo, Netherlands, assignors to N.V. Hollandse Signaalapparaten, Hengelo, Overijssel, Netherlands, a firm of the Netherlands
Filed Jan. 28, 1966, Ser. No. 523,758
Claims priority, application Netherlands, Feb. 1, 1965, 65—1,247
6 Claims. (Cl. 343—709)

ABSTRACT OF THE DISCLOSURE

A radar aerial mounting system is disclosed in which a vertical support is mounted in a radome by means of a gimbal suspension system, and the axis of the support is maintained by means of a gyroscopic control system. A search radar aerial is mounted on one end of the support, and a tracking radar aerial is mounted on the other end of the support.

---

The invention relates to a shipborne radar system comprising a (first) radar apparatus having at least one aerial continuously rotatable about an azimuth axis for searching targets, and at least one second radar apparatus having an aerial adapted to rotate about an azimuth axis and an elevation axis for tracking a target detected by said first radar apparatus.

In such a radar system the tracking aerial of the second radar apparatus is directed to a target to be tracked by slewing the comparatively sharp beam of the tracking aerial into the azimuth direction of the target supplied by the first radar apparatus, and by elevating it subsequently until target echoes are received.

A difficulty arises from the fact that during the time the tracking aerial is slewed in azimuth, the roll and pitch of the ship causes the ship's deck to change its position with respect to the position held at the moment when the azimuth of the target was measured by the first radar, i.e. search radar. Though the scanning motion in elevation of the beam emitted by the tracking aerial is then still performed in the substantially correct azimuth direction, the scanning plane, owing to the said variation in position of the ship's deck, will be at a correspondingly varying angle to the plane of the beam emitted by the search aerial at the instant when the azimuth of the target was measured. In the event of heavy roll and pitch and of a great height of the target, the error involved is frequently greater than half the angular aperture of the beam emitted by the tracking aerial.

Without taking further steps it will not be possible then to direct the tracking aerial to the target.

This problem may be solved by stabilizing the search aerial and the tracking aerial. However stabilization of an aerial is not a simple matter, since the required apparatus is costly and this measure causes the over-all radar system to be considerably heavier and more complicated. Moreover, a relative error in the separate servo systems used for the two aerials is practically unavoidable.

The invention has for its object to provide a radar system of the kind set forth, in which both the tracking aerial and the search aerial are stabilized and in which, whilst the free view of these aerials essentially required for a satisfactory operation is maintained, the combination of the following advantages is obtained:

(a) relative stabilization errors cannot occur;
(b) the stabilization of the search aerial and of the tracking aerial is obtained in a particularly effective and inexpensive way;
(c) the stabilization of the search aerial is obtained without the system becoming appreciably more complicated or heavier;
(d) the stabilization is effected by means of low motor power.

According to the invention the tracking aerial is mounted to the upper and the search aerial to the lower end portion of a support which is common to both said aerials and which in known manner by means inter alia of two concentric gimbal frames and a gyroscopically controlled servo system is stabilized about two co-planar, orthogonal axes, whilst the outermost gimbal frame is rigidly supported parallel to the deck by the inner wall of a substantially spherical radome enclosing the two aerials and being anchored to the ship.

The invention and its advantages will be described more fully with reference to the figures, of which:

In these figures corresponding parts are designated by the same reference numerals.

Figure 1:
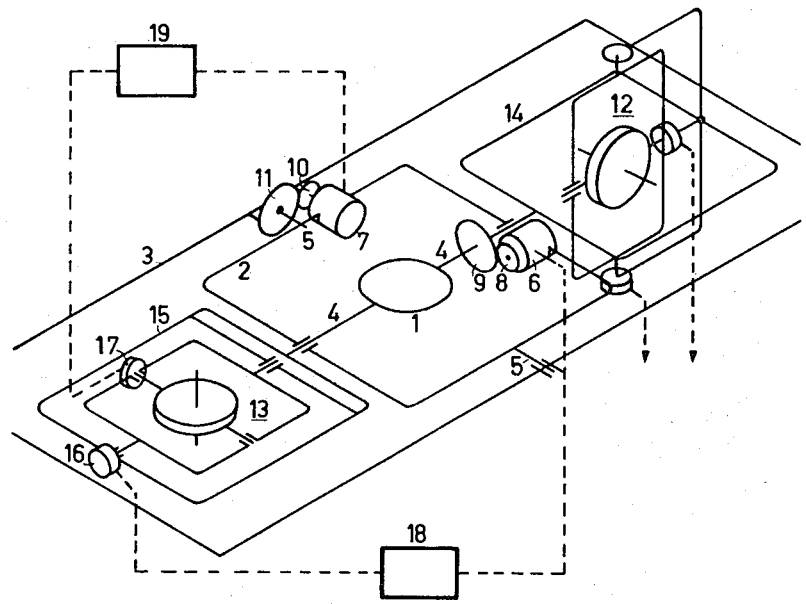
FIG. 1 shows a basic diagram of a known stabilization system.

Referring to FIG. 1, reference numeral 1 designates a body or platform to be stabilized. This body is cardanically suspended by means of two concentric gimbal frames 2 and 3 and two co-planar, orthogonal shafts 4 and 5. If the body to be stabilized is aboard a ship, the shaft 5, rigidly secured to the inner gimbal frame 2, is, as usual, in line with the "dead ahead" direction of the ship and rotatably mounted in the gimbal frame 3, which is rigidly secured to the ship. The inner gimbal frame 2 is provided with two servo motors 6 and 7. By means of the gear wheel transmissions 8, 9 and 10, 11 these servo motors, when properly energized, are capable of tilting the body 1 to be stabilized about the shafts 4 and 5 so that with respect to a stable reference this body is held in a given fixed position. The stable reference is provided by gyroscopes 12 and 13, the respective housings 14 and 15 of which, as will be seen from the figure, are secured to the extremities of the shaft 4 connected with the body to be stabilized, said extremities projecting from the gimbal frame 2. The two gyroscopes have two degrees of freedom. The gyroscope 12 has a spin axis in the horizontal plane and is orientated in a given direction (for example North); it is therefore termed the azimuth or directional gyroscope, which supplies synchro-data used inter alia for calculating corrections required in view of deviations in azimuth owing to yawing of the ship. Since the gyroscope 12 does not play a direct part in the stabilization of the body 1, it will be left out of consideration here.

The stabilization gyroscope 13 has a spin axis which by means of the conventional gyroscopic control-means is held in an accurately vertical position. This gyroscope, which is termed vertical gyroscope, supplies at its two outputs 16 and 17, formed by synchros, two error voltages as soon as the gyroscope housing 15 is moved, out of the zero position determined by the vertical spin axis of the vertical gyroscope. These error voltages are applied through the respective servo amplifiers 18 and 19 to the servo motors 6 and 7 respectively, which tilt the body to be stabilized so that these error voltages are reduced to zero value.

In the following an embodiment of the ship's radar system according to the invention will be described in further detail, reference being made to FIG. 2 or FIG. 3 and, as far as possible, to both these figures simultaneously.

Figure 2:
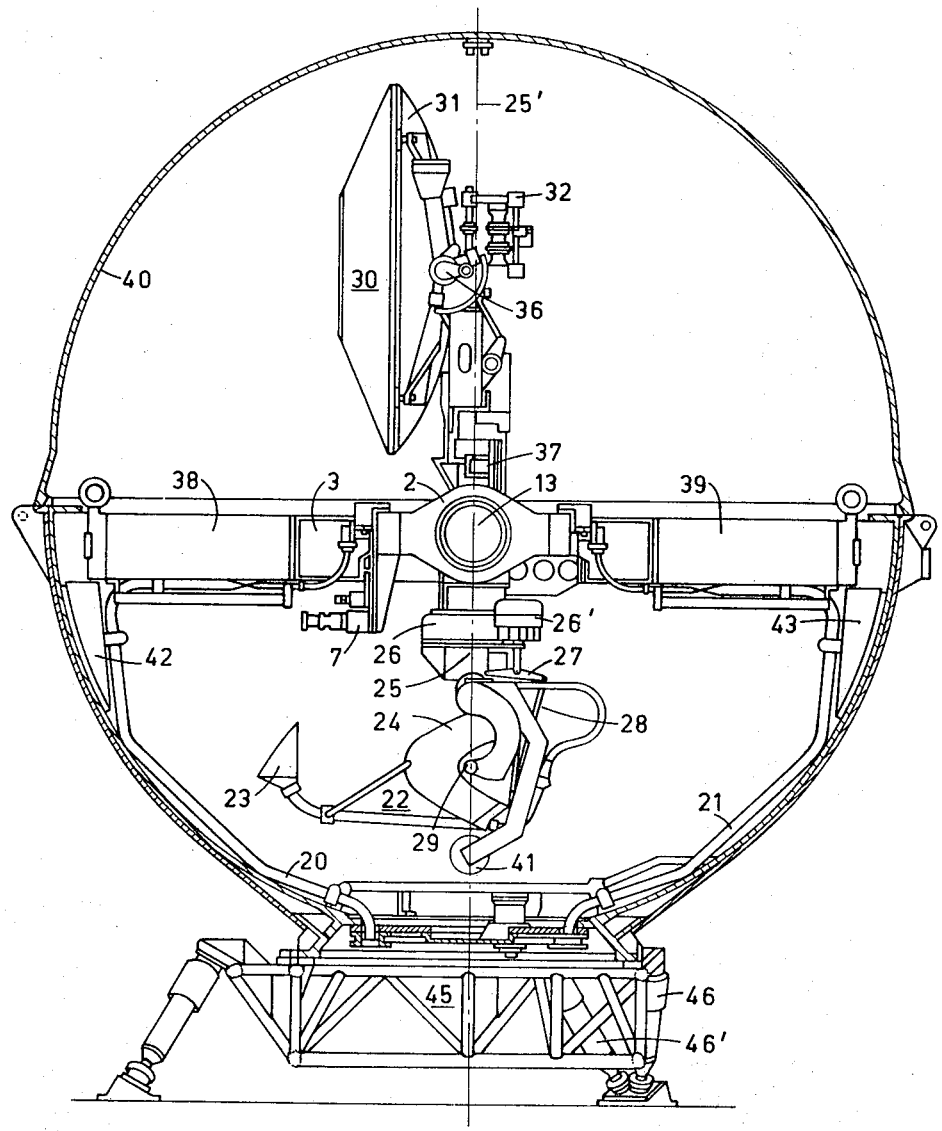
FIG. 2 shows partly a cross-sectional view of an embodiment of the aerial system employed in the radar system according to the invention, in which the stabilization system of FIG. 1 is used.

Referring to FIG. 2, reference numerals 20 and 21 designate two waveguides to each of which a separate radar apparatus (not shown) is connected. The first of these two radar apparatus is continuously operative and is connected to a search aerial 22. In the embodiment shown this search aerial is of the type that scans space along a helical pattern. It consists of the combination of a radiator 23 and a reflector 24 and driven by the motor 26 it is continuously rotated about the azimuth shaft 25. At the same time, through a transmission 26', the driving motor 26 moves the lever 27 comparatively slowly up and down. The reflector 24 is coupled through the rod 28 with the lever 27 and is therefore during the rotation about the azimuth shaft 25, slowly tilted, around the shaft 29 so that said helical scanning pattern is obtained.

The second of the two radar apparatus is connected to a tracking aerial 30. This aerial is of the type that consists of a reflector 31 with two pairs of radiators (not shown) which are fed alternately pairwise through a monopulse cluster 32. In the receiver of the second radar apparatus each pair of simultaneously received echo signals is in known matter compared in amplitude or phase, which results in two control voltages which as long as the target to be tracked is illuminated by the tracking aerial, form a measure for the deviation of this target from the bore sight axis 33 of the aerial. These control voltages (see FIG. 3) are applied to the motors 34 and 35 respectively, which by rotation about the azimuth shaft 25' and the elevation axis 36 control the tracking aerial 30 so that this aerial is kept on the target to be tracked. The radar system so far described is intended for use aboard ships and for this purpose it is desirable for the search aerial 22 and the tracking aerial 30 to tbe stabilized with respect to a stable reference.

According to the invention a favourable and particularly advantageous shipborne radar system of the kind described is obtained in that the tracking aerial 30 is mounted to the upper and the search aerial 22 to the bottom end portion of a support 37, which is common to both aerials and which, in the known manner described with reference to FIG. 1, by means inter alia of two concentric gimbal frames 2 and 3 and a gyroscopically controlled servo system 6 to 19 is stabilized about two co-planar, orthogonal axes 4 and 5, and in that the outermost gimbal frame 3 of said frames is fixedly supported parallel to the deck by the inner wall of a substantially spherical radome 40, enclosing the two aerials and being anchored to the ship.

By using only a single stabilization system for the stabilization of the two aerials, a considerable economy is obtained, while, moreover, the over-all weight of the system is materially reduced and relative stabilization errors cannot occur.

In the embodiment shown in the figures the gimbal shafts 4 and 5 are hollow and the support 37 is formed by a hollow column. The waveguides are passed through said hollow column and said hollow shafts, and by means of the necessary rotatable waveguide joints and the waveguides 20 and 21 establish the connection of each of said radar apparatus with its associated aerial.

Figure 3:
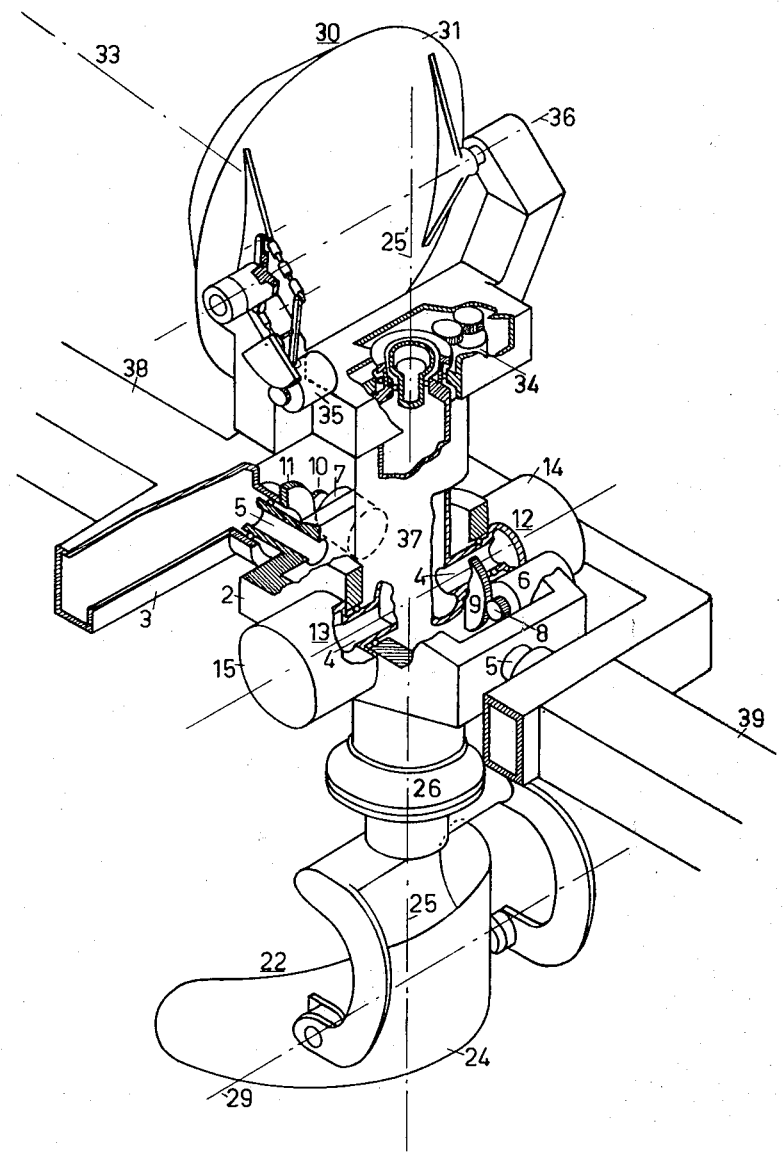
FIG. 3 is a perspective view of this aerial system.

Dead weight in the form of counterweights frequently present with stabilized aerials is practially avoided in the construction shown in FIGS. 2 and 3, since the place and the weight of the search aerial 22 ensure that the point of gravity of the construction is located approximately at the centre of the gimbal system. If desired the said point of gravity can be made to be situated exactly in the centre of the gimbal system by using a small counterweight 41 shown in FIG. 2.

The radome 40 is made of reinforced synthetic resin and, as is shown in FIG. 2, it comprises two hemispheres. With a view to increasing the rigidity the lower hemisphere of the radome is preferably of a double walled sandwich construction. It is moreover provided with two consoles 42 and 43 also made of reinforced synthetic resin, on which two arms 38 and 39 respectively rest, thereby fixedly supporting the outermost gimbal frame 3 in parallel to the deck. A particularly important advantage of this way of supporting the outermost gimbal frame 3 is that supporting columns or the like, which periodically would interrupt the free view of the search aerial 22 upon rotation thereof, are completely avoided. It will be obvious that the rigidity inherent to the spherical shape of the radome provides a structurally very firm support for the arms 38, 39 and thus for the outermost gimbal frame 3.

The radome is borne by a delta-shaped supporting structure 45, which is anchored to the ship with the aid of three pairs of legs such as 46, 46'. Since the radome protects the aerial structure against the influence of the weather, the power of the motors employed in the system may be comparatively smaller because these motors need not overcome any torques produced by wind.

In the radar system according to the invention as described above use is made of a stabilizing system of the type shown diagrammatically in FIG. 1, in which the gyroscope housings are directly connected with the body to be stabilized. This construction has the advantage that the ship's own varying deformations caused by the rolling and pitching cannot affect the stabilization. If the inaccuracy produced by said ship's deformations is of minor importance or if this inaccuracy is corrected in some other way, it is possible to arrange the gyroscope at a distance remote from the body to be stabilized, for example in the meta-centre of the ship.

A further modification of the embodiment described above may be obtained by applying an outermost gimbal frame 3 of such dimensions that it may directly be supported by the inner wall of the radome, the arms 38 and 39 being omitted.

It should furthermore be noted that the search aerial 22 and the tracking aerial 30 may be replaced by other types of aerials; the search aerial 22 may, for example, have such a structure that a beam emitted by said aerial is wide in elevation, for example fan-shaped or $cosec^2$-shaped, whereas the tracking aerial 30 may be of such a structure that a beam emitted by said aerial moves along a circle of small diameter so that a conical scan is obtained. It should finally be noted that the transmitters of the first and of the second radar apparatus may be combined to a single transmitter, the power of which is distributed among the two aerials by a power divider.

What we claim is:

1. In a shipborne radar system of the type having an aerial system positioned within a radome that is mounted in a fixed position with respect to a ship, the improvement wherein said aerial system comprises a vertically extending common support, a gimbal suspension system having outer support means rigidly fixed to said radome and an inner member pivotally mounted to a central portion of said common support, whereby said common support is free to move about two orthogonal axes, a gyroscopically controlled servo system connected to said suspension system for maintaining said common support in a substantially vertical position, a first radar aerial mounted on one end of said common support for movement about a vertical axis, and a second radar aerial mounted on the other end of said common support for movement about a vertical axis.

2. The radar system of claim 1 comprising means for rotating at least one of said first and second aerials about a horizontal axis.

3. The radar system of claim 1 wherein said outer member is an outer gimbal frame, and said inner member is an inner gimbal frame pivotally mounted within said outer frame about an axis normal to the pivotal axis of said common support, and asid outer frame is mounted in a position with its plane substantially parallel to the deck of said ship.

4. The radar system of claim 3 comprising a plurality of arms extending to the inner surface of said radome for rigidly supporting said outer frame.

5. In a shipborne radar system of the type having an aerial system positioned within a substantially spherical radome, said radome being fixedly mounted with respect to a ship, the improvement wherein said aerial system comprises a common vertically extending support, a gimbal suspension system comprising an outer gimbal frame, and an inner gimbal frame pivotally mounted in said outer frame on a first axis, means pivotally mounting the central portion of said common support in said inner frame on a second axis normal to said first axis, whereby said common support is free to rotate about two orthogonal axes, means for fixedly mounting said outer frame to the inner wall of said radome, a gyroscopically controlled control system connected to said suspension system for maintaining said common support in a substantially vertical position, a search radar aerial mounted for continuous rotation about a vertical axis on one end of said common support, a tracking aerial pivotally mounted on the other end of said common support, and means for rotating said tracking aerial about vertical and horizontal axes.

6. The radar system of claim 5 in which said search aerial is a helical scanning aerial, comprising means for reciprocating said search aerial about a horizontal axis.

No references cited.

RICHARD A. FARLEY, *Primary Examiner.*

RODNEY D. BENNETT, *Examiner.*

C. L. WHITHAM, *Assistant Examiner.*